(12) United States Patent
Chapa

(10) Patent No.: US 12,398,691 B1
(45) Date of Patent: Aug. 26, 2025

(54) DUAL WIND TURBINE SYSTEM

(71) Applicant: John Joseph Walter Chapa, Boyle (CA)

(72) Inventor: John Joseph Walter Chapa, Boyle (CA)

(73) Assignee: John Joseph Walter Chapa, Boyle (CA)

( * ) Notice: Subject to any disclaimer, the term of this patent is extended or adjusted under 35 U.S.C. 154(b) by 0 days.

(21) Appl. No.: 18/897,721

(22) Filed: Sep. 26, 2024

(51) Int. Cl.
*F03D 3/02* (2006.01)
*F03D 3/00* (2006.01)
*F03D 3/04* (2006.01)
*F03D 9/25* (2016.01)

(52) U.S. Cl.
CPC ............... *F03D 3/02* (2013.01); *F03D 3/005* (2013.01); *F03D 3/04* (2013.01); *F03D 9/25* (2016.05); *F05B 2220/706* (2013.01); *F05B 2270/20* (2013.01)

(58) Field of Classification Search
CPC . F03D 3/02; F03D 3/04; F03D 3/0409; F03D 3/0418; F03D 3/05; F05B 2270/20; F05B 2270/706
See application file for complete search history.

(56) References Cited

U.S. PATENT DOCUMENTS

| | | | |
|---|---|---|---|
| 4,084,918 A * | 4/1978 | Pavlecka | F03D 3/062 415/4.4 |
| 7,488,150 B2 | 2/2009 | Krippene | |
| 7,948,109 B2 | 5/2011 | Gray | |
| 8,192,138 B2 | 6/2012 | Kelaiditis | |
| 8,262,338 B2 * | 9/2012 | Cassidy | F03D 1/0608 415/55.1 |
| 8,882,439 B2 | 11/2014 | Vaz | |
| 8,961,103 B1 | 2/2015 | Wolff | |
| 9,169,827 B2 | 10/2015 | Tsitron | |
| 10,823,140 B2 * | 11/2020 | Samarasinha | F03D 80/30 |
| 2010/0310361 A1 | 12/2010 | Carre | |
| 2012/0148403 A1 * | 6/2012 | Flaherty | F03D 3/02 290/55 |
| 2016/0123299 A1 | 5/2016 | Zhao | |
| 2021/0355909 A1 | 11/2021 | Pienczykowski | |

FOREIGN PATENT DOCUMENTS

DE 3049791 A1 1/1983

* cited by examiner

*Primary Examiner* — Nathaniel E Wiehe
*Assistant Examiner* — Maxime M Adjagbe
(74) *Attorney, Agent, or Firm* — Argus Intellectual Enterprise, LLC; Jordan Sworen; Daniel Enea

(57) ABSTRACT

A dual wind turbine system is provided. The dual wind turbine system includes two individually rotating turbines mounted vertically on top of each other, each connected to an independent directional scoop for enhanced wind capture. The stacked first and second rotors rotate in opposite directions, maximizing power generation efficiency. The system includes a stabilizer positioned at the top, which aligns the directional scoops and rotors into the wind. The rotors are supported by a central shaft, with the stabilizer and directional scoops pivotally connected at a same point, allowing continuous alignment with wind direction. The first and second rotors are coaxially aligned, wherein the first directional scoop channels wind into the first rotor from one direction and the second directional scoop channels wind into the second rotor from an opposite direction.

20 Claims, 5 Drawing Sheets

DUAL WIND TURBINE SYSTEM

BACKGROUND OF THE INVENTION

The present invention relates to wind turbine systems. More specifically, the present invention comprises a dual wind turbine system having two individually rotating turbines mounted vertically on top of each other, each connected to an independent directional scoop for enhanced wind capture. The first and second rotors of the system are designed to rotate in opposite directions, maximizing power generation efficiency while minimizing space and environmental impact.

Wind energy is a widely recognized and utilized renewable energy source, with traditional wind turbine systems being a common sight in various landscapes. These systems typically consist of large, single-rotor turbines mounted on tall shafts to capture wind at higher altitudes. While effective in generating power, these conventional wind turbines come with several limitations.

Firstly, standard wind turbines require significant space for installation. The large blades need ample clearance to rotate freely without obstruction, and the tall shafts necessitate substantial foundational support. This extensive spatial requirement makes it challenging to install wind turbines in densely populated or limited space areas, reducing their potential deployment locations.

Secondly, the efficiency of traditional wind turbines is often limited by the unidirectional rotation of their single rotor. Wind patterns can be unpredictable and variable, causing fluctuations in power generation. Additionally, single-rotor systems do not fully capitalize on the available wind energy, leading to suboptimal performance in certain conditions.

Moreover, the environmental impact of standard wind turbines is a growing concern. The substantial land area they occupy can disrupt local ecosystems and wildlife habitats. Noise pollution from the rotating blades and the visual impact on the landscape are additional drawbacks that have prompted the search for more efficient and less intrusive wind energy solutions.

Several alternative wind turbine designs have attempted to address these issues. For example, vertical-axis wind turbines (VAWTs) offer a more compact design and can capture wind from any direction. However, VAWTs generally suffer from lower efficiency and power output compared to their horizontal-axis counterparts. Another approach is the use of multiple smaller turbines in an array, but this method still requires significant space and does not fully resolve the efficiency limitations.

There is a clear need for a wind turbine system that can generate more power from the same amount of wind while occupying less space and minimizing environmental impact. The present invention addresses these needs by incorporating two individually rotating wind turbines stacked vertically. The directional scoops of the dual wind turbine system are designed to effectively channel wind into the rotors. The compact structure of the dual rotors reduces the spatial footprint and environmental disruption, making it suitable for a wider range of installation sites. Additionally, the stabilizer and pivot point design enable continuous alignment with the wind direction, ensuring optimal performance in varying wind conditions.

In light of the devices disclosed in the known art, it is submitted that the present invention substantially diverges in design elements and methods from the known art and consequently it is clear that there is a need in the art for a dual wind turbine system. In this regard the instant invention substantially fulfills these needs.

SUMMARY OF THE INVENTION

In view of the foregoing disadvantages inherent in the known types of wind turbine systems now present in the known art, the present invention provides a new dual wind turbine system having two individually rotating turbines mounted vertically on top of each other, each connected to an independent directional scoop for enhanced wind capture. The first and second rotors of the system are designed to rotate in opposite directions, maximizing power generation efficiency while minimizing space and environmental impact.

It is an objective of the present invention to provide a dual wind turbine system comprising a pair of rotating turbines mounted vertically on top of each other, each connected to an independent directional scoop for enhanced wind capture. The stacked first and second rotors rotate in opposite directions, maximizing power generation efficiency. A stabilizer positioned at the top of the system is configured to align the directional scoops and rotors into the wind. The rotors are supported by a central shaft, with the stabilizer and directional scoops pivotally connected at a same point, allowing continuous alignment with wind direction. The first and second rotors are coaxially aligned, wherein the first directional scoop channels wind into the first rotor from one direction and the second directional scoop channels wind into the second rotor from an opposite direction.

It is an objective of the present invention to provide a dual wind turbine system that maximizes power generation efficiency. This is achieved by utilizing two independently rotating wind turbines stacked vertically, which rotate in opposite directions to fully harness the wind energy.

It is an objective of the present invention to provide a dual wind turbine system to enhance the wind capture efficiency via a pair of directional scoops that channel wind into the rotors, ensuring optimal wind flow and increasing overall energy production. The design incorporates a stabilizer and pivot point mechanism, which allows the gathering elements to continuously align with the wind, ensuring consistent performance.

It is therefore an object of the present invention to provide a new and improved dual wind turbine system that has all of the advantages of the known art and none of the disadvantages.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
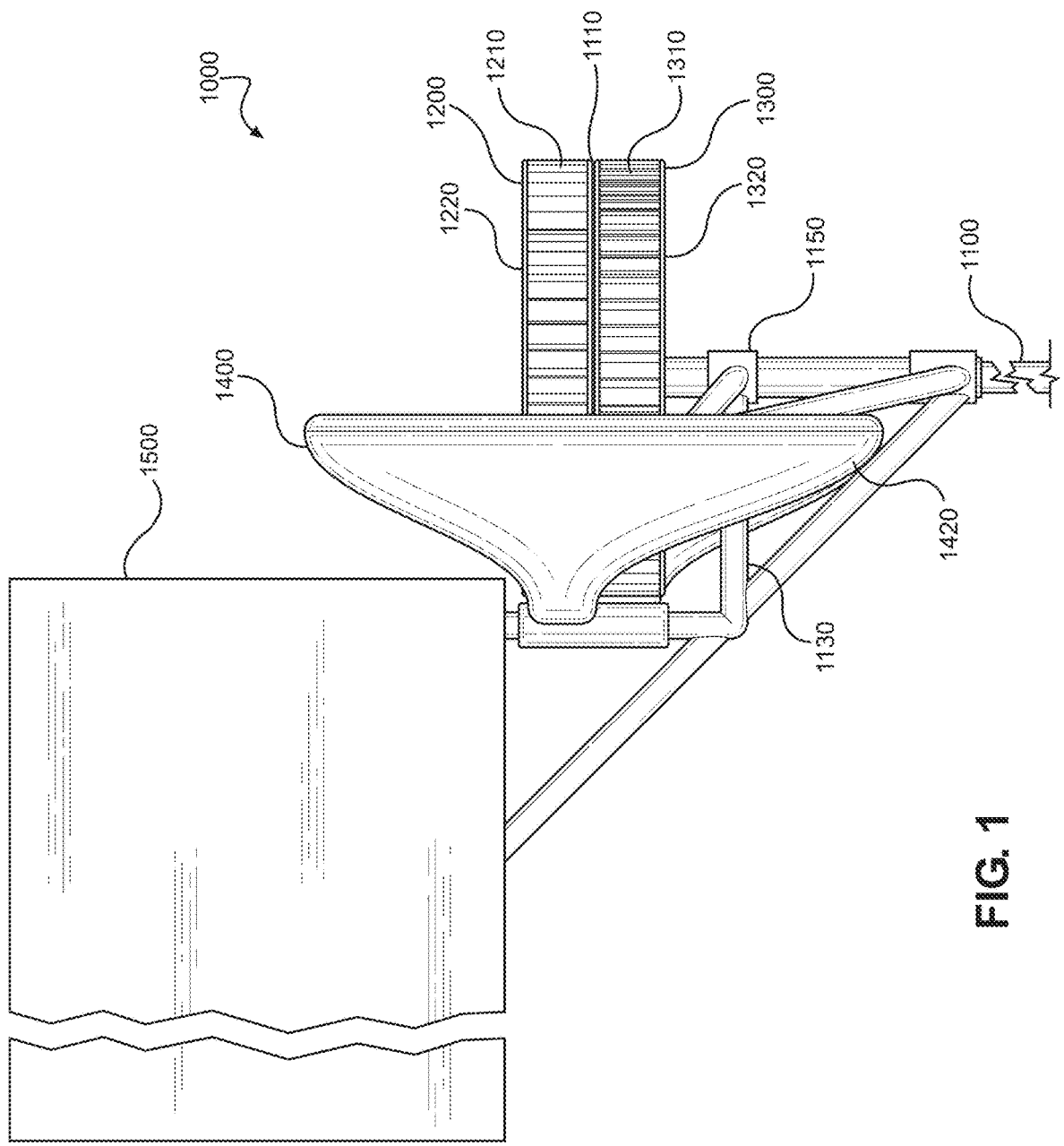
FIG. 1 shows a side view of an embodiment of the dual wind turbine system.

Reference is made herein to the attached drawings. Like reference numerals are used throughout the drawings to depict like or similar elements of the system. For the purpose of presenting a brief and clear description of the present invention, the embodiment discussed will be used for enhancing the efficiency and effectiveness of wind energy capture and conversion by utilizing a vertically stacked configuration of two independently rotating rotors, each connected to directional scoops. The figures are intended for representative purposes only and should not be considered to be limiting in any respect. Furthermore, the described features, structures, or characteristics may be combined in any suitable manner in one or more embodiments. In the following description, numerous specific details are provided to give a thorough understanding of embodiments.

Reference will now be made in detail to the exemplary embodiment (s) of the invention. References to "one embodiment," "at least one embodiment," "an embodiment," "one example," "an example," "for example," and so on indicate that the embodiment(s) or example(s) may include a feature, structure, characteristic, property, element, or limitation but that not every embodiment or example necessarily includes that feature, structure, characteristic, property, element, or limitation. Further, repeated use of the phrase "in an embodiment," "first embodiment," "second embodiment," or "third embodiment" does not necessarily refer to the same embodiment.

Figure 2:
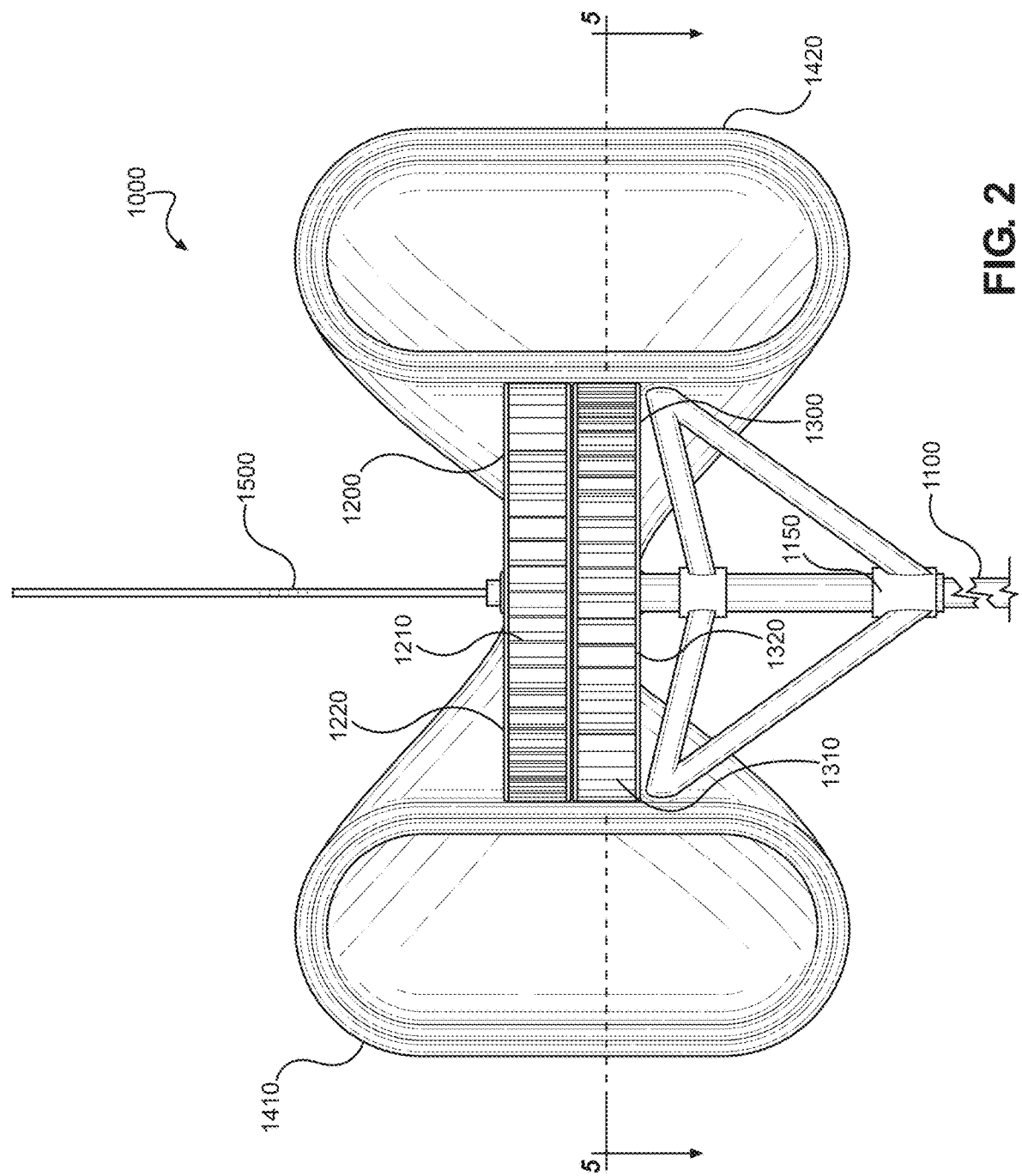
FIG. 2 shows a front view of an embodiment of the dual wind turbine system.

Referring to FIGS. 1 and 2, there is shown a side view and a front view of an embodiment of the dual wind turbine system, respectively. In the illustrated embodiment, the dual wind turbine system 1000 comprises a first rotor 1200 and a second rotor 1300. The rotors 1200, 1300 each comprise a plurality of blades 1210, 1310 radially positioned around a central hub 1220, 1320 of the rotors. The number of blades 1210, 1310 and their spacing are determined based on aerodynamic considerations and the desired balance between rotor efficiency and structural integrity. In some embodiments, the blades 1210, 1310 are designed with an airfoil shape, which means they have a curved profile that generates lift as wind flows over them. Each blade is mounted at a specific angle of attack, which is the angle between the chord line of the blade (a straight line from the leading edge to the trailing edge) and the direction of the oncoming wind. The angle of attack is optimized to maximize lift while minimizing drag, ensuring efficient conversion of wind energy into rotational motion.

In the illustrated embodiment, the blades 1210, 1310 are disposed in a fixed-pitch configuration, wherein the angle of the blades is set during installation and remains constant. In alternate embodiments, the blades comprise a variable-pitch configuration, wherein the angle of the blades can be adjusted dynamically to respond to changing wind conditions, optimizing performance and protecting the system from excessive loads. The blades 1210, 1310 are composed of lightweight, high-strength materials such as carbon fiber composites or fiberglass. These materials are adapted to provide a balance of durability and efficiency.

The blades 1210, 1310 are attached to the central hub 1220, 1320 which serves as the core of the rotor 1200, 1300. The hub 1220, 1320 is constructed from high-strength steel or aluminum alloys to withstand the mechanical stresses and loads generated during operation. The hub includes mounting points for each blade, allowing for secure attachment and optimal blade positioning.

The rotors 1200, 1300 are positioned vertically, with the first rotor 1200 located above the second rotor 1300. This vertical stacking allows for efficient use of space and enhances overall system performance by minimizing aerodynamic interference between the rotors 1200, 1300. In the dual wind turbine system 1000, the first and second rotors 1200, 1300 rotate in opposite directions. The blades 1210 on the first rotor 1200 are oriented to rotate clockwise, while the blades 1310 on the second rotor 1300 are oriented to rotate counterclockwise (or vice versa). This counter-rotational design reduces aerodynamic interference between the two rotors and enhances overall system efficiency. In the illustrated embodiment, a gap 1110 is disposed between the first and second rotors 1200, 1300 to allow for independent rotation and increased wind capture efficiency. In the illustrated embodiment, the first and second rotors 1200, 1300 lay on parallel horizontal planes.

The hubs 1220, 1320 are connected to a central shaft 1100, which transfers the rotational energy from each rotor 1200, 1300 to a generator or other mechanical components. The shaft 1000 is designed to handle high torque loads and is made from steel or other high-strength materials. In some embodiments, the shaft includes a mechanism to adjust the height of the first and second rotors relative to each other. The shaft 1100 is connected to a base (not shown) to allow the turbine system 1000 to be supported in an upright configuration.

The dual wind turbine system 1000 further comprises a first stator and a second stator, each corresponding to the first rotor and the second rotor, respectively, wherein each stator is independent from the other stator. The stators are a stationary part of the system that contains windings or coils of wire. In the illustrated embodiment, the stator windings are where the induced electrical current is collected. stators provide a magnetic field, wherein the rotors convert mechanical energy into electrical energy by moving within this magnetic field. A commutator ensures that the generated current flows in the desired direction. This operation results in the efficient conversion of mechanical energy into electrical energy.

The dual wind turbine system 1000 further comprises a wind gathering system 1400 having a first directional scoop 1410 configured to channel wind the first rotor 1200 and a second directional scoop 1420 configured to channel wind to the second rotor 1300. The wind gathering system 1400 provides for optimal wind channeling, wherein the first directional scoop channels wind into the first rotor from one direction and the second directional scoop channels wind into the second rotor from an opposite direction.

The directional scoops are shaped to optimize wind capture and enhance the rotational speed of the rotors 1200, 1300, wherein the distal end 1440 of each directional scoop comprises a face 1450 having a substantially oval shape to direct airflow to the respective rotor. In the illustrated embodiment, the distal end 1440 of each directional scoop 1410, 1420 extend above the first rotor 1200 and below the second rotor 1300. The relative size allows the scoops 1410, 1420 to capture enough wind to feed the respective rotor. Both directional scoops comprise a hollow interior volume to capture air flow. In the illustrated embodiment, an interior edge of each of the directional scoops comprise an abrupt angled deflector 1405 at the proximal end of the directional scoops. The angled deflector 1405 is a tapered point or protrusion that extends from a lower side to an upper side of each directional scoop and is configured to force any remaining airflow into each rotor.

In the illustrated embodiment, the wind gathering system extends from multiple arms that are rotatably connected to the shaft 1100. A first and second pivot point 1150 are adapted to rotate 360 degrees about the shaft 1100 via an upper and lower collar rotatably secured to the shaft 1100. The directional scoops 1410, 1420 extend from opposing sides of an L-shaped arm 1130 at a proximal end and terminate at opposing distal ends 1440. The L-shaped arm 1130 extends from the upper collar to provide support to the proximal end of the directional scoops, wherein a pair of V-shaped arms extend from each side of the lower collar and secure to a distal end of a respective directional scoop to provide support thereto.

A stabilizer 1500 extends from the shaft 1100 above the first and second rotors 1200, 1300, wherein the stabilizer 1500, the first directional scoop 1410, and the second directional scoop 1420 are pivotally connected to the shaft 1100 via the L-shaped arm 1130 and a rear arm via the upper and lower collars. The L-shaped arm is secured to and configured to provide support to the front end of the stabilizer, whereas the rear arm extends between the lower collar and the rear end of the stabilizer to provide support thereto. This configuration allows the first and second directional scoops 1410, 1320 to rotate and align with a wind direction. The stabilizer 1500 ensures continuous alignment with wind direction. In the illustrated embodiment, the stabilizer 1500 comprises a sail-like structure to maintain alignment with the wind direction.

Figure 3:
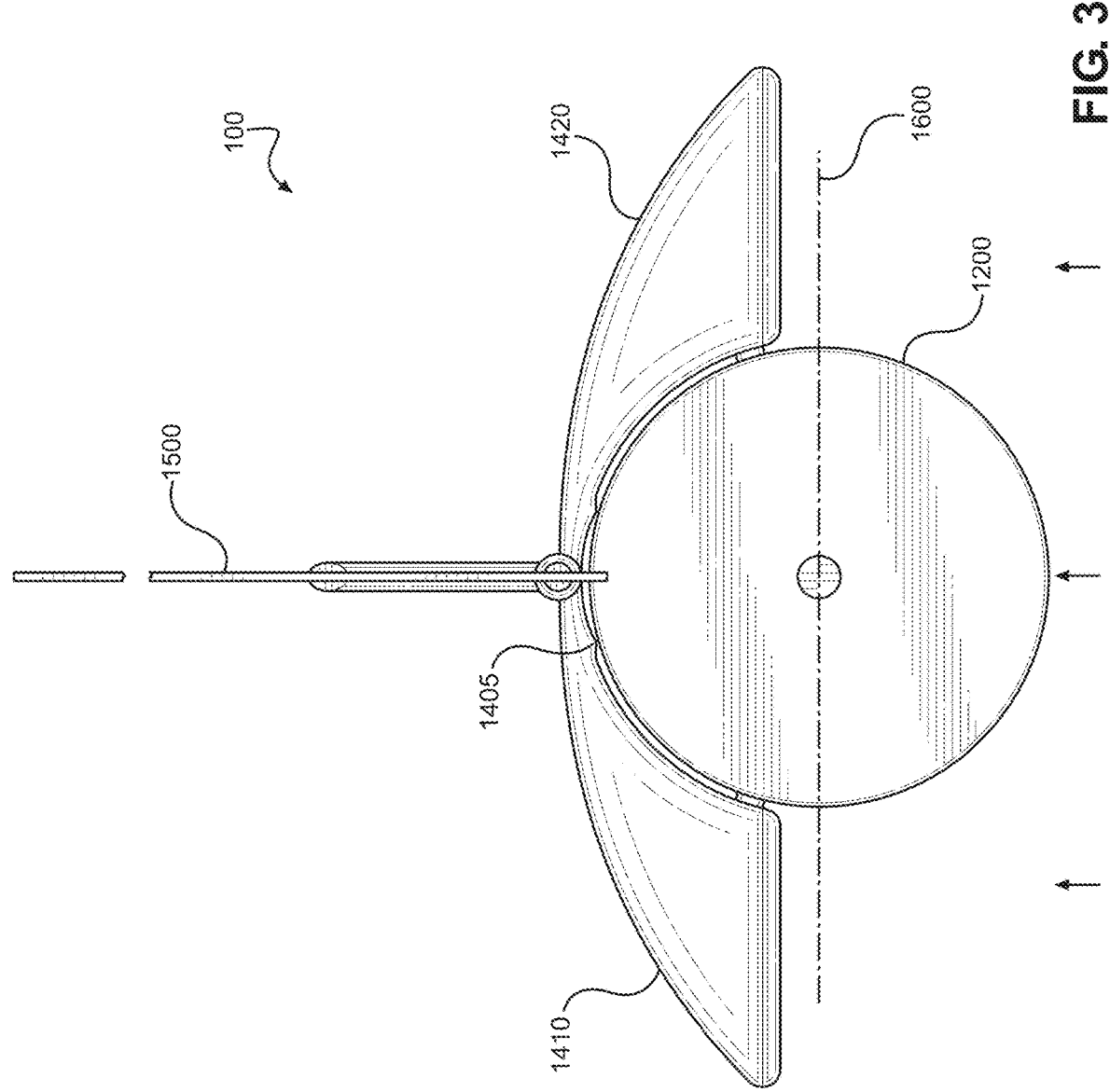
FIG. 3 shows a top planar view of an embodiment of the dual wind turbine system.
Figure 4:
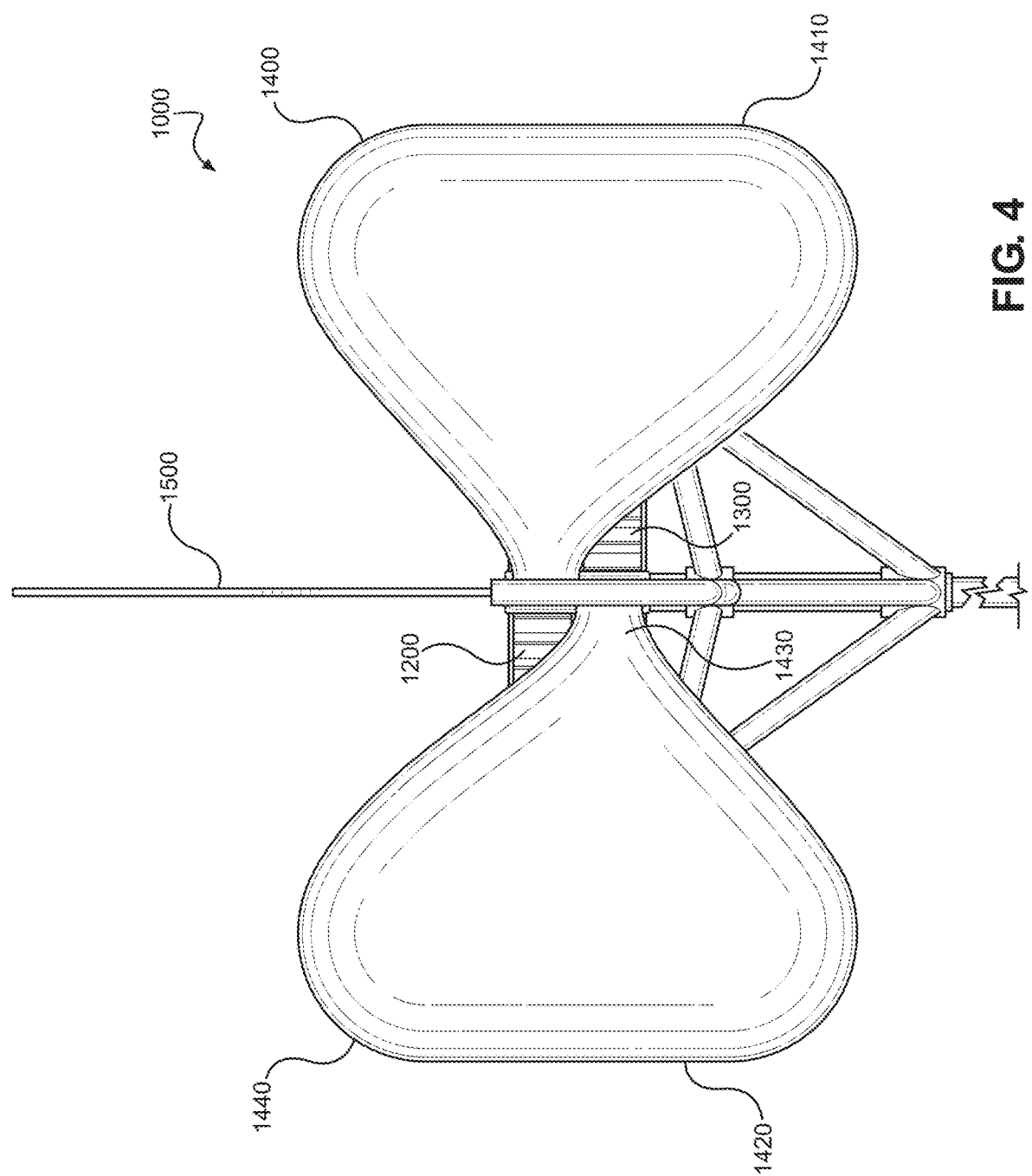
FIG. 4 shows a rear view of an embodiment of the dual wind turbine system.

Referring to FIGS. 3 and 4, there is shown a top planar view and a rear view of an embodiment of the dual wind turbine system, respectively. In the illustrated embodiment, the first directional scoop 1410 is secured in a fixed position relative to the second directional scoop 1420, such that the orientation between the directional scoops is invariable. The distal end 1440 of the first directional scoop 1410 is aligned across from the distal end 1440 of the second directional scoop 1420 with the rotors located in between. In the illustrated embodiment, the distal ends 1440 of the directional scoops are always located behind a centerline 1600 that bisects the rotors vertically. The distal ends are placed symmetrically across from each other on either side of this centerline. This configuration ensures that the scoops are positioned to capture wind from opposite directions, funneling it into their respective rotors. By positioning the distal ends of the scoops behind the centerline, the design ensures that the scoops are oriented to capture wind from a wider range of directions. This orientation allows the system to take advantage of varying wind patterns and maximize wind capture. The symmetrical placement across the centerline 1600 ensures that wind is funneled evenly into both rotors, optimizing the energy capture from the available wind resources. Placing the directional scoops 1410, 1420 behind the centerline 1600 helps in minimizing turbulence that can occur when wind flows around the rotors. The directional scoops 1410, 1420 act as wind guides, smoothing the airflow and directing it efficiently into the rotors, reducing aerodynamic losses. This positioning also ensures that the scoops do not obstruct each other or the rotors, maintaining a clear and unobstructed path for the wind to reach the blades.

The proximal end of the first directional scoop extends from either the arm or, in some embodiments, the proximal end of the second directional scoop, with the first directional scoop positioned above the second. Each proximal end is aligned with the corresponding rotor to ensure efficient wind channeling.

Figure 5:
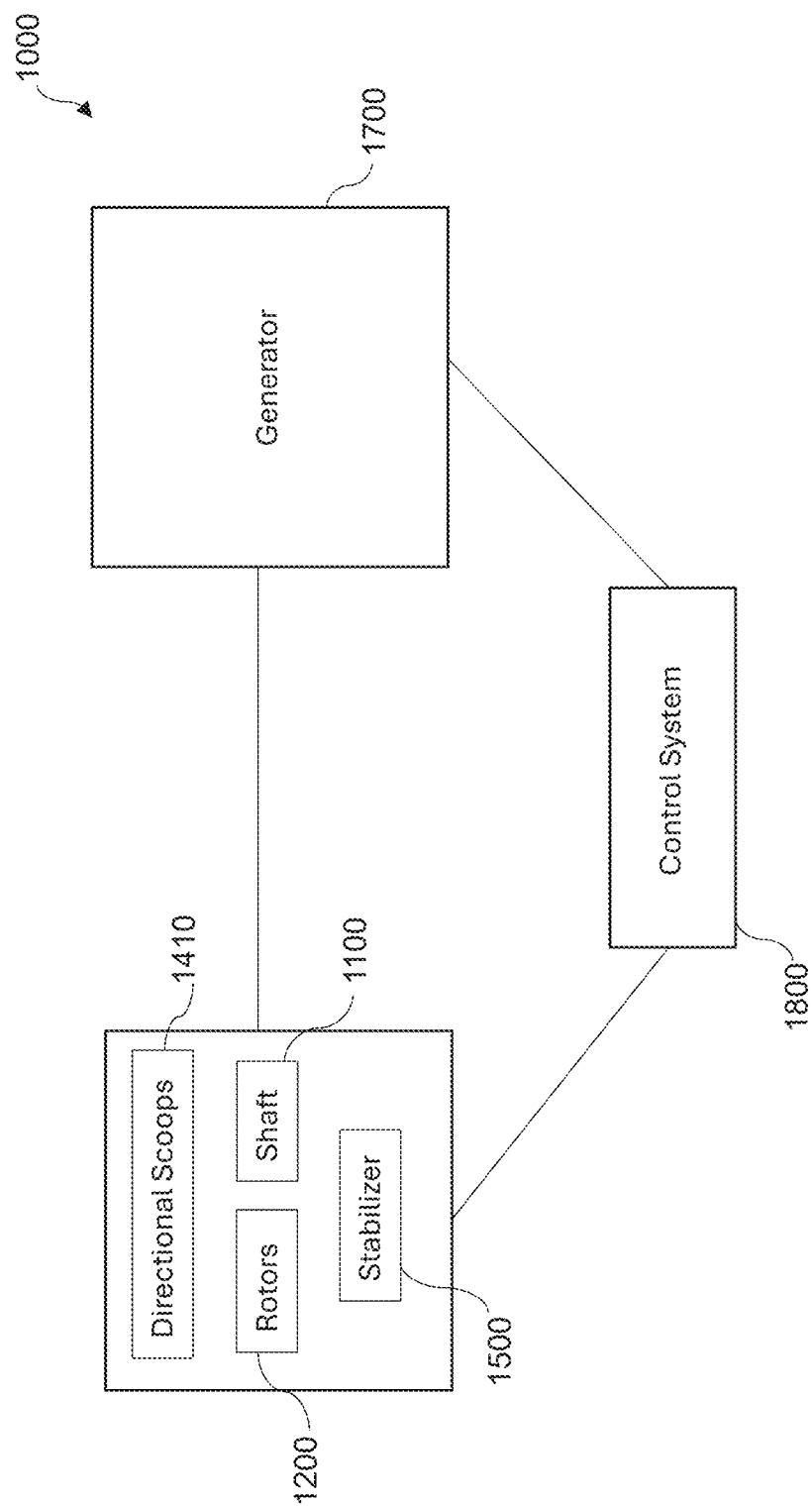
FIG. 5 shows a block diagram of an embodiment of the dual wind turbine system.

Referring now to FIG. 5, there is shown a block diagram of an embodiment of the dual wind turbine system. In some embodiments, the system 1000 comprises the generator 1700 that is operably connected to each rotor 1200 to convert rotational energy into electrical energy. In some embodiments, the dual wind turbine system 1000 comprises a control system 1800 to manage various aspects of the turbine's operation, including the generators, rotor speeds, blade pitch, and alignment with the wind direction. The control system 1800 comprises a central processing unit (CPU) configured to process data from various sensors and executing control algorithms to optimize turbine performance and sensors adapted to continuously monitor the speed and direction of the wind, providing real-time data to the CPU. In some embodiments, the sensor include rotation speed sensors installed on the rotors to measure the rotational speed of each rotor and blade pitch sensors adapted to track the angle of the blades, providing feedback for pitch adjustments. In alternate embodiments, the control system comprises a height adjustment actuator operably connected to the shaft and adapted to change the height of the rotors to optimize wind capture.

The control system includes communication interfaces such as Ethernet, Wi-Fi, or cellular connections, allowing for remote monitoring and control of the turbine. An operator can access performance data, receive alerts, and make adjustments as needed. The control system continuously monitors the rotational speed of the upper and lower rotors using the rotational speed sensors. If the rotors deviate from their optimal speed ranges, the control system adjusts the blade pitch to either increase or decrease rotational speed, ensuring efficient energy capture.

In operation, as wind flows through a location with the dual wind turbine system, the directional scoops each channel the wind into the rotors. The rotors begin to rotate in opposite directions, driven by the wind. The stabilizer maintains the alignment of the directional scoops with the wind direction, optimizing wind capture. If the system includes a generator, the rotational energy is converted into electrical energy, which can be transmitted to a power grid or stored in batteries.

In the illustrated embodiment, the dual wind turbine system is constructed from aluminum or high-density composite materials, both of which offer a lightweight yet robust framework capable of withstanding operational loads and environmental stresses. In some embodiments, the system is additionally covered with a wind and load-rated polypropylene skin. The polypropylene skin comprises a high strength, light weight, and long service life, typically ranging from 15 to 20 years. It is both economical and durable, making it an ideal choice for covering the system's rotating and stabilizing elements, as well as the directional scoops.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A dual wind turbine system, comprising:
   a first rotor and a second rotor disposed in a coaxial configuration, wherein the first rotor is stacked adjacent the second rotor and each rotate about a shaft;
   a wind gathering system extending around the first and second rotors, comprising:
      a first directional scoop configured to direct wind into the first rotor;
      a second directional scoop configured to direct wind into the second rotor;
      wherein the first and second directional scoops are linked via a pivot to the shaft, the pivot configured to cooperatively rotate the first and second directional scoops about the shaft:
   a first stator and a second stator, each corresponding to the first rotor and the second rotor, respectively, wherein each stator is independent from the other stator;
   wherein each of the first and second directional scoops comprises an inlet simultaneously disposed rearward a centerline that bisects the first and second rotors;
   wherein each of the first and second directional scoops comprises an outlet configured to direct captured wind to a rear side of the respective first and second rotors;
   wherein first and second distal ends of the respective first and second directional scoops are symmetrically disposed on opposite sides of a perpendicular bisector of the centerline.

2. The dual wind turbine system of claim 1, wherein the first and second rotors lay on a parallel plane.

3. The dual wind turbine system of claim 1, wherein the first directional scoop channels wind into the first rotor from one direction and the second directional scoop channels wind into the second rotor from an opposite direction.

4. The dual wind turbine system of claim 3, wherein the channels narrow to increase the speed of air prior to engaging the respective first and second rotors.

5. The dual wind turbine system of claim 1, further comprising a gap between the first and second rotors to allow for independent rotation and increased wind capture efficiency.

6. The dual wind turbine system of claim 1, further comprising a shaft extending through a center of each of the first and second rotors.

7. The dual wind turbine system of claim 1, further comprising a stabilizer extending from the shaft above the first and second rotors, wherein the stabilizer, the first directional scoop, and the second directional scoop are each pivotally connected to the shaft at a pivot point, allowing the first and second directional scoops to rotate and align with a wind direction.

8. The dual wind turbine system of claim 7, wherein the stabilizer comprises a sail-like structure to maintain alignment with the wind direction.

9. The dual wind turbine system of claim 7, wherein the pivot point allows the first and second directional scoops and stabilizer to continuously align with the wind direction.

10. The dual wind turbine system of claim 1, further comprising a generator connected to each rotor to convert rotational energy into electrical energy.

11. The dual wind turbine system of claim 1, further comprising a control system to monitor and adjust the rotation of the first and second rotors for optimal performance.

12. The dual wind turbine system of claim 1, wherein the first and second a directional scoop each comprises a proximal end, with the proximal end of the first directional scoop extending from the proximal end of the second directional scoop.

13. The dual wind turbine system of claim 12, wherein the proximal end of the first directional scoop is positioned above the proximal end of the second directional scoop.

14. The dual wind turbine system of claim 12, wherein each proximal end of the directional scoops is aligned with the first and second rotor, respectively, to ensure optimal wind channeling into the rotors.

15. The dual wind turbine system of claim 1, wherein the distal end of each directional scoop comprises an inlet having an oval shape to direct airflow to the respective rotor.

16. The dual wind turbine system of claim 1, wherein the first directional scoop and the second directional scoop are independently configured to direct wind into their respective first and second rotors from opposite directions.

17. The dual wind turbine system of claim 1, wherein each of the first and second directional scoops comprises a narrowing channel having a decreasing vertical height from the distal end to the proximal end.

18. The dual wind turbine system of claim 1, further comprising a stabilizer positioned above the first and second rotors, wherein the stabilizer, the first directional scoop, and the second directional scoop are pivotally connected at a common pivot configured to allow coordinated rotation and alignment with a wind direction.

19. The dual wind turbine system of claim 18, wherein the stabilizer continuously remains rearward of the distal ends of the first and second directional scoops.

20. The dual wind turbine system of claim 1, wherein a plurality of blades of each of the first and second rotors is disposed radially about the shaft.

\* \* \* \* \*